No. 838,993. PATENTED DEC. 18, 1906.
I. H. HOLLANDER.
MEANS FOR KEEPING CREDIT AND INSTALMENT ACCOUNTS.
APPLICATION FILED APR. 5, 1906.

Fig. 1. 2 SHEETS—SHEET 1.

Name _____ 2 _____

Address _____ 3 _____

John Doe 2e 2a  No. 1 6
FURNITURE AND CARPET COMPANY  Credit Department
8  Washington, D.C. _____ 6a _____ 190
This is to Certify, That I have hired and received from John Doe Furniture and Carpet Company, the following goods:

| ITEMS | AMOUNT | ITEMS | AMOUNT |
|---|---|---|---|
| 9a | 10a | 9a | 10a |
| 9 | 10 | 11 | 12 |
| 2c | | | 2d |

For which I agree to pay the sum of $ 50 Cash, and a _____ Weekly _____ installment of $ 5 on the _____ day of each Month _____ until the amount of the within is paid

13

Witness _____ 15 _____  Signature _____ 14 _____ Seal

2b

Witnesses:  Inventor
C.D. Kesler  Irvin H. Hollander
E. Weaver  By James L. Norris
 Atty.

No. 838,993. PATENTED DEC. 18, 1906.
I. H. HOLLANDER.
MEANS FOR KEEPING CREDIT AND INSTALMENT ACCOUNTS.
APPLICATION FILED APR. 5, 1906.

2 SHEETS—SHEET 2.

Fig. 1ª

UNITED STATES PATENT OFFICE.

IRVIN H. HOLLANDER, OF WASHINGTON, DISTRICT OF COLUMBIA.

MEANS FOR KEEPING CREDIT AND INSTALMENT ACCOUNTS.

No. 838,993.      Specification of Letters Patent.      Patented Dec. 18, 1906.

Application filed April 5, 1906. Serial No. 310,166.

*To all whom it may concern:*

Be it known that I, IRVIN H. HOLLANDER, a citizen of the United States, residing at Washington, in the District of Columbia, have invented certain new and useful Improvements in Means for Keeping Credit and Instalment Accounts, of which the following is a specification.

The invention relates to a combined record and ledger sheet for use in connection with the keeping of credit or instalment accounts; and the object thereof is to provide means in a manner as hereinafter set forth for the purpose referred to to facilitate the keeping of such accounts and to overcome the objection now existing in the method in general vogue of keeping such accounts.

In the methods now in general vogue in the handling of credit and instalment accounts the blank forms of contracts and the ledger accounts are bound in separate and distinct volumes, which necessitates a considerable loss of time and labor in handling such accounts, owing to the fact that the contract must first be referred to to ascertain the terms upon which the sale was made and for other information, and then the ledger must be referred to to ascertain various payments made, as well as for recording a payment or for other information and in cases where there are two or more contracts by the same creditor the time and labor are correspondingly increased, and it will also be noted that in the method now in vogue it is often necessary to keep a set of books open for one or more delinquent accounts.

To overcome the foregoing objections and to facilitate the keeping of such credit or instalment accounts is the object of this invention, and to obtain such object the invention resides in providing in a manner, as herein set forth, a combined record and ledger sheet formed with a contract and ledger division.

With the foregoing and other objects in view the invention consists of the combined record and ledger sheet, as hereinafter pointed out, and illustrated in the accompanying drawings, which form a part of this specification and wherein is shown the referred embodiment of the invention; but it is to be understood that changes, variations, and modifications can be resorted to which come within the scope of the claim hereunto appended.

In describing the invention in detail reference is had to the accompanying drawings, wherein—

Figures 1 and 1ª, when taken together, illustrate in plan a combined contract and ledger sheet in accordance with this invention.

Referring to the drawings by reference characters, 1 denotes a sheet of suitable material which may be formed in a known manner, so as to constitute what is termed a "loose ledger-leaf" to enable a plurality of such sheets to be bound together in book form so the sheets can be removed and other sheets added when occasion requires. The sheet 1 at its top is provided with a plurality of longitudinally-extending lines 2, 3, 4, and 5, which are designated for the purpose for which they are intended, the line 2 having the inscription "Name" at one end, so as to indicate that upon said line is to be placed the name of the purchaser. The line 3 has the inscription "Address" at one end, so as to indicate that upon line 3 is to be placed the address of the purchaser. The line 4 has the inscription "Occupation" at one end, so as to indicate that upon line 4 is to be placed the occupation of the purchaser, and the line 5 has the inscription "Remarks" at one end, so as to indicate that upon line 5 is to be placed any remarks in connection with the purchaser. The sheet 1 is furthermore provided at a point below lines 3 5 with a series of longitudinally-extending lines $2^a$, each of which is placed in close proximity to one another, and the sheet 1 is furthermore provided at a point in proximity to its lower edge with a series of longitudinally-extending lines $2^b$, each of which is arranged in close proximity to each other. The lines $2^a$ and the lines $2^b$ at one end are joined together by the lines $2^c$, which extend in a horizontal direction, and the said horizontally-extending lines $2^c$ are removed the necessary distance from that side edge of the sheet which is to be secured when detachably binding a plurality of the sheets together. That portion of the sheet 1 which is inclosed by the lines $2^a$, $2^b$, and $2^c$ is divided by the horizontally-extending lines $2^d$, so as to form the sheet with a contract-division and a ledger-division.

The contract-division is provided with an inscription, as at $2^e$, to indicate the name of the company or house which is using the sheet and is provided with a longitudinally-extending line 6 with the abbreviation "No." at one end, and upon said line 6 is placed the number of the contract and below said line 6 is arranged an inscription 6ª to indicate to which department the contract belongs. By way of example, the inscription 6ª reads "Credit department." The contract-division is also provided with an inscription to indicate the name of the city and a line for the day, month, and year, as at 7, and has also an inscription, as at 8, reading that the goods referred to in the contract-division have been hired from the house, (indicated by the inscription 2ᵉ.) Below the inscription 8 the contract-division is provided with a series of horizontally and vertically extending lines to form a series of columns of spaces 9, 10, 11, and 12. Above the columns of spaces 9 and 11 an inscription is provided, as at 9ª, to indicate for what use the columns of spaces 9 and 11 are employed, and above the columns of spaces 10 and 12 an inscription, as at 10ª, is provided to indicate for what purpose the columns of spaces 10 and 12 are to be used. The columns of spaces 9 and 11 are adapted to receive the names of each article sold, and the columns of spaces 10 and 12 are adapted to receive the cost of each article sold, the cost being placed at the side of the article, as will be evident. Below the columns of spaces 9, 10, 11, and 12 a blank contract is arranged, as at 13, and said contract embodies a line, as at 15, for a witness's signature, the line 15 being suitably designated for the purpose for which it is intended. The contract 13 also embodies a line 14 for the purchaser's signature, and said line 14 is suitably designated for what purpose it is intended.

The ledger-division is divided by a vertically-extending line 15ᵇ into a debit and a credit portion, and the said ledger-division is provided with a series of horizontally-extending and longitudinally-extending lines to form a series of columns of spaces 14ª, 15ª, and 16 for the debit portion and columns of spaces 20, 21, 22, 23, 24, and 25 for the credit portion. The spaces of the column 14ª are adapted to receive the date, and at the top of said column 14ª an inscription, as at 17, is provided to indicate for what purpose the spaces of the column of spaces 14ª are used. The spaces of column 15ª are adapted to receive the salesman's designation, and at the top of said column 15ª an inscription, as at 18, is provided to indicate for what purpose the spaces of the column 15ª are to be used. The spaces of the column 16 are adapted to receive the amount of the purchase, and at the top of said column 16 an inscription, as at 19, is provided to designate for what purpose the spaces of the column 16 are to be used. Above the inscriptions 17, 18, and 19 an inscription 13ª is provided to indicate the debit portion of the ledger-division. The spaces of the columns of spaces 20, 21, and 22 of the credit portion of the ledger-division are adapted to receive the amounts paid by the purchaser, and the spaces of the columns of spaces 23 24 25 of the credit portion of the ledger-division are adapted to receive the date on which the payment is made. At the top of each of the columns 20 21 22 an inscription, as at 31, is provided to designate for what purpose the said columns are to be used, and at the top of the columns 23 24 25 an inscription, as at 30, is provided to designate for what purpose the said columns 23, 24, and 25 are to be used, and above the said inscriptions 30 and 31 an inscription, as at 28, is provided to designate the credit portion of the ledger-division of the sheet. The column of spaces 23 associates with the column of spaces 20, the column 24 associates with the column of spaces 21, and the column of spaces 25 associates with the column of spaces 22. The column of spaces 20 and 23, as well as the column of spaces 21 and 24 and the column of spaces 22 and 25, are divided by longitudinally-extending lines 26, so as to form what may be termed "monthly portions," each monthly portion containing five spaces, upon each of which can be recorded the date and the amount of a payment. As shown, the two associating columns of spaces are divided into twelve monthly portions, and each monthly portion has printed thereon in light type an abbreviation to indicate the month, as at 27. The printed abbreviations are only shown in connection with the associating columns 20 and 23; but the same system is carried out in connection with the associating columns 21 and 24 and 22 and 25 and as many associating columns as may be desired. Only three sets of associating columns are shown which will permit of the account being kept for three years; but it is evident that additional sets of associating columns can be used, so that the account can be kept for a longer period. The monthly divisions of each associating column can be divided by a suitable means so as to indicate a quarter of a year, a half or a year, or a third of a year. As shown, the monthly divisions are divided by a heavy line 29, so as to indicate the third of a year. This manner of dividing the monthly divisions facilitates the bookkeeper to ascertain very readily the amount paid quarterly, triannually, or semi-annually. The abbreviations 27 are printed in such light type as to be readily observed, but not to obscure the entry as to date and amount of payment.

When opening an account, the name, address, and occupation of the purchaser are placed at the proper point upon the sheet. The contract-division is then numbered and the date of the purchase also placed at the proper position. The goods purchased are then itemized in the column of spaces 9 or 9 and 11, if occasion requires, and the cost of the goods is placed in the column 10 and column 12, if occasion requires. The contract 13 is then filled out, signed, and witnessed, and the date of the sale, the name of the salesman, and the amount of the purchase are then entered upon the debit portion of the ledger-division in the columns 14, 15, and 16, respectively. If the goods are bought upon a weekly payment, and when the purchaser pays his instalment, the date and amount paid are placed in the spaces of the monthly division. For example, it will be stated that the first weekly instalment is due the first week in January and the date of paying the instalment and the amount of the payment are recorded in the first space of the monthly division, indicated by the abbreviation "Jan." When the second instalment is paid, it is recorded in the second space, &c. If the goods are sold in a monthly instalment, but one record is made in each monthly division. The same system is carried on throughout.

If the customer should desire to open another account while the first one is running, all that is necessary to do is to use the contract-division of the ledger-sheet and attach it in front of the first sheet used. The debit portion and credit portion of the original sheet can be used in connection with the second contract, as will be evident, as sufficient spaces are provided in the debit portion of the ledger-division for additional purchases.

Having thus fully described my invention, what I claim as new, and desire to secure by Letters Patent, is—

Means for keeping credit and instalment accounts comprising a sheet of suitable material provided with a suitably-designated column of record-spaces, said sheet further having at one side of the record-spaces a plurality of suitably-designated columns of spaces which constitute a debit portion, said sheet further having at one side of the debit portion a plurality of suitably-designated columns of spaces constituting a credit portion, said sheet further provided with means for dividing the spaces of said columns of spaces of said credit portion into groups of spaces and said sheet further having conventional indications in the groups of spaces to designate each group for a different month of a year.

IRVIN H. HOLLANDER.

Witnesses:
 HARRY H. HOLLANDER,
 OWEN H. FOWLER.